United States Patent
Ueki

(10) Patent No.: US 10,210,910 B2
(45) Date of Patent: Feb. 19, 2019

(54) RECORDING MEDIUM CASE, RECORDING MEDIUM UNIT AND ELECTRONIC DEVICE

(71) Applicant: Panasonic Intellectual Property Management Co., Ltd., Osaka-shi, Osaka (JP)

(72) Inventor: Yusuke Ueki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/636,248

(22) Filed: Jun. 28, 2017

(65) Prior Publication Data

US 2018/0130504 A1 May 10, 2018

Related U.S. Application Data

(63) Continuation of application No. PCT/JP2015/005938, filed on Nov. 30, 2015.

(30) Foreign Application Priority Data

Jan. 9, 2015 (JP) .................................. 2015-003586

(51) Int. Cl.
*G06F 1/16* (2006.01)
*G11B 33/02* (2006.01)
(Continued)

(52) U.S. Cl.
CPC .............. *G11B 33/022* (2013.01); *G06F 1/16* (2013.01); *G06F 1/1616* (2013.01);
(Continued)

(58) Field of Classification Search
CPC ....... G06F 1/1656; G06F 1/1658; G06F 1/187
See application file for complete search history.

(56) References Cited

U.S. PATENT DOCUMENTS 6,094,342 A * 7/2000 Dague ..................... G06F 1/184
  312/333
6,233,143 B1 * 5/2001 Gamble ............... G11B 33/122
  312/332.1
(Continued)

FOREIGN PATENT DOCUMENTS

CN 101312066 A 11/2008
CN 102097116 A 6/2011
(Continued)

OTHER PUBLICATIONS

The Extended European Search Report dated Nov. 24, 2017 for the related European Patent Application No. 15876774.9, 8 pages.
(Continued)

*Primary Examiner* — Anthony Q Edwards
(74) *Attorney, Agent, or Firm* — Hamre, Schumann, Mueller & Larson, P.C.

(57) ABSTRACT

HDD case (100) accommodates HDD device (60) having a disk medium and forms HDD unit (50). HDD unit (50) is removably disposed in an accommodating section of an electronic device. HDD device (60) has a substantially rectangular shape. Besides, HDD case (100) has a pair of side sections (120) located parallel to slot-in/pull-out directions in which HDD unit (50) is slotted into the accommodating section and is pulled out from the accommodating section. Further, protruding section (121) is formed on side sections (120) such that a part of side sections (120) is protruded on the outer side of HDD case (100). In a state where HDD case (100) is accommodated in the accommodating section of the electronic device, protruding section (121) makes contact with the side surface of the accommodating section.

13 Claims, 12 Drawing Sheets

(51) Int. Cl.
   *G11B 33/08*     (2006.01)
   *G11B 33/12*     (2006.01)
   *H05K 5/02*      (2006.01)

(52) U.S. Cl.
   CPC .......... *G06F 1/1632* (2013.01); *G06F 1/1656* (2013.01); *G11B 33/02* (2013.01); *G11B 33/08* (2013.01); *G11B 33/12* (2013.01); *H05K 5/02* (2013.01)

(56) References Cited

U.S. PATENT DOCUMENTS

| | | | | |
|---|---|---|---|---|
| 6,249,432 B1 * | 6/2001 | Gamble | ............... | G06F 1/184 248/618 |
| 6,487,071 B1 | 11/2002 | Tata et al. | | |
| 7,006,351 B2 * | 2/2006 | Chen | ............... | G06F 1/184 248/222.11 |
| 7,088,579 B1 * | 8/2006 | Konshak | ............... | G06F 1/184 361/679.32 |
| 7,326,078 B1 * | 2/2008 | Hsu | ............... | G06F 1/187 361/727 |
| 7,515,407 B2 * | 4/2009 | Goodman | ............... | G11B 33/08 248/634 |
| 7,593,221 B2 * | 9/2009 | Sheng | ............... | G11B 33/08 361/679.35 |
| 7,983,033 B2 * | 7/2011 | Antonuccio | ............... | G11B 33/128 312/223.2 |
| 8,547,658 B1 * | 10/2013 | Szeremeta | ............... | G11B 25/043 360/97.19 |
| 8,971,036 B1 * | 3/2015 | Lau | ............... | G06F 1/20 361/679.34 |
| 9,172,153 B2 * | 10/2015 | Tsai | ............... | G11B 33/124 |
| 2005/0237707 A1 * | 10/2005 | Connelly, Jr. | ............... | G11B 33/08 361/679.36 |
| 2008/0158810 A1 * | 7/2008 | Liu | ............... | G06F 1/187 361/679.33 |
| 2008/0291618 A1 | 11/2008 | Sheng | | |
| 2010/0020438 A1 * | 1/2010 | Gross | ............... | G11B 33/08 360/97.19 |

FOREIGN PATENT DOCUMENTS

| | | |
|---|---|---|
| JP | 63-133389 | 6/1988 |
| JP | 2001-256769 | 9/2001 |
| JP | 2009-187614 | 8/2009 |
| JP | 2014-116052 | 6/2014 |

OTHER PUBLICATIONS

English Translation of Chinese Search Report dated Sep. 13, 2018 for the related Chinese Patent Application No. 201580071675.8, 2 pages.

* cited by examiner

Slot-in/Pull-out Directions

Slot-in/Pull-out Directions

Back ← → Front
Slot-in/Pull-out Directions

Back ← → Front
Slot-in/Pull-out Directions

RECORDING MEDIUM CASE, RECORDING MEDIUM UNIT AND ELECTRONIC DEVICE

TECHNICAL FIELD

The present disclosure relates to a recording medium case in which a recording medium device having a disk medium is accommodated, a recording medium unit having the recording medium case, and an electronic device capable of accommodating the recording medium unit.

BACKGROUND ART

Patent Literature 1 discloses an electronic device having a hard disk drive (a recording medium device having a disk medium). The hard disk drive is accommodated in the housing of the electronic device via an elastic material, so that the hard disk drive has increased vibration-resistant performance.

For example, when a slot that opens into the outside is disposed on the housing of the electronic device, the structure allows the user to slot a recording medium unit (i.e., a recording medium device or a unit including the recording medium device) into the electronic device or to remove the unit from the electronic device (hereinafter, the operation may be referred to slot-in/pull-out operations) with no need for opening the housing with a tool.

CITATION LIST

Patent Literature

PTL 1: Japanese Unexamined Patent Application Publication No. 2009-187614

SUMMARY OF THE INVENTION

The present disclosure discloses a recording medium case in the first exemplary embodiment.

The recording medium case accommodates a recording medium device having a disk medium, and the case is removably disposed in an accommodating section of the electronic device. The recording medium device has a substantially rectangular shape. The recording medium case has a pair of side sections that are located parallel to slot-in/pull-out directions in which the recording medium device is slotted into the accommodating section and is pulled out from the section. Further, the recording medium case has at least one protruding section formed on each side section such that at least one part of each side section is protruded on the outer side of the recording medium case. When the recording medium case is accommodated in the accommodating section of the electronic device, the at least one protruding section makes contact with one of side surfaces of the accommodating section.

The present disclosure discloses a recording medium unit in the second exemplary embodiment.

The recording medium unit has the recording medium case of the first exemplary embodiment of the present disclosure and a recording medium device accommodated in the recording medium case.

The present disclosure discloses an electronic device in the third exemplary embodiment.

The electronic device has the recording medium unit of the second exemplary embodiment of the present disclosure and an accommodating section capable of accommodating the recording medium unit. The accommodating section has a pair of side surfaces. When the recording medium unit is accommodated in the accommodating section, the pair of side surfaces of the accommodating section faces each side section of the recording medium case and makes contact with the at least one protruding section formed on each side section of the recording medium case.

According to the structure of the present disclosure, when the recording medium unit is accommodated in the accommodating section of the electronic device, the protruding section makes contact with the side surface of the accommodating section. Under the state where the unit is accommodated in the electronic device, the structure suppresses rattling of the recording medium unit; at the same time, when the electronic device undergoes a shaky movement, the structure absorbs the vibration and suppresses transmission of the vibration to an HDD (hard disk drive) unit. This enhances the vibration-resistant performance of the HDD unit.

Besides, according to the present disclosure, the protruding section is so formed that a part of each side section of the recording medium case is protruded to the outside of the recording medium case, and therefore, the section that makes contact with the side surface of the accommodating section is limited to the protruding section, which is a part of the side section of the recording medium case. Therefore, when the recording medium unit is slotted into the accommodating section or pulled out of the accommodating section, the structure has sliding friction—produced between the side surface of the accommodating section and the recording medium case of the recording medium unit—smaller than the structure where each side surface of the accommodating section makes contact with the recording medium case with the entire area. This allows the recording medium unit to be easily slotted in, or easily pulled out of, the accommodating section of the electronic device.

As described above, when a recording medium device is removably disposed in an electronic device, the recording medium case of the present disclosure enhances operability of slot-in/pull-out operations and vibration-resistant performance.

DESCRIPTION OF EMBODIMENTS

Hereinafter, an exemplary embodiment will be described in detail, with reference to the accompanying drawings. However, details beyond necessity—for example, descriptions on well-known matters or on substantially identical structures—may be omitted to eliminate redundancy from the description below for easy understanding of those skilled in the art.

It is to be understood that the accompanying drawings and the description below are provided by the applicant for purposes of full understanding of those skilled in the art and are not to be construed as limitation on the scope of the claimed disclosure.

First Exemplary Embodiment

Hereinafter, the structure of the first exemplary embodiment will be described with reference to the accompanying drawings.

1. Structure 1-1. General Picture of Electronic Device

Figure 1:
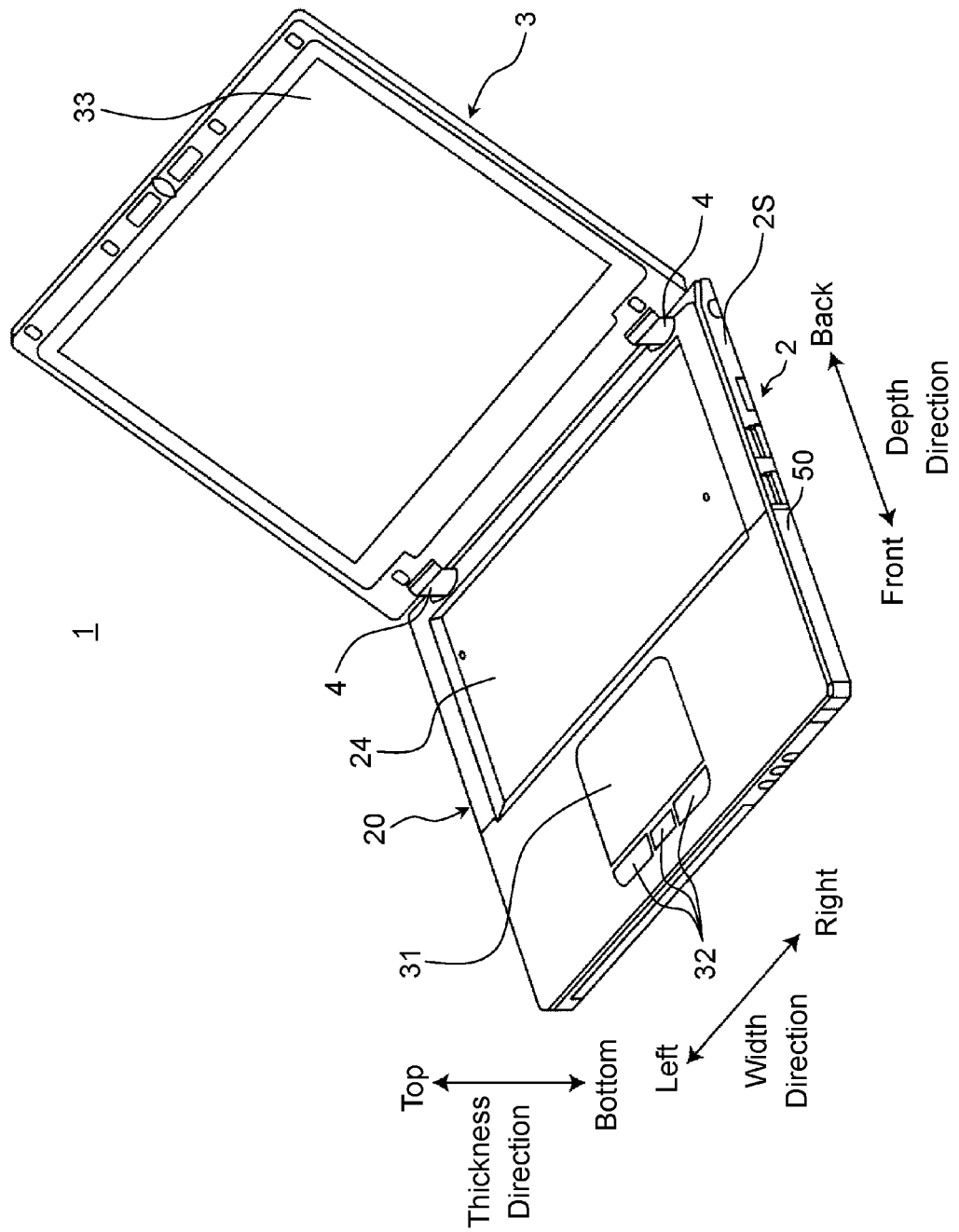
FIG. 1 is a perspective view of an electronic device in accordance with a first exemplary embodiment.

FIG. 1 is a perspective view of an electronic device in accordance with the first exemplary embodiment. As shown in FIG. 1, electronic device 1 is a notebook computer. Electronic device 1 has main unit 2, display unit 3, and hinge 4 disposed between main unit 2 and display unit 3. Display unit 3 is rotatively connected to main unit 2 via hinge 4. Main unit 2 has housing 20 formed of metal, such as magnesium alloy. Housing 20 of main unit 2 has a keyboard, touch pad 31 and a plurality of operation buttons 32 on its top surface. (Instead showing the keyboard, FIG. 1 shows dent section 24 in which the keyboard is disposed). Display unit 3 has liquid crystal display (LCD) panel 33.

Main unit 2 of electronic device 1 accommodates removable hard disk drive unit 50 (hereinafter, referred to HDD unit 50) in side 2S that is located parallel to the width direction of main unit 2.

1-2. Structure of Hard Disk Drive Unit

Figure 2:
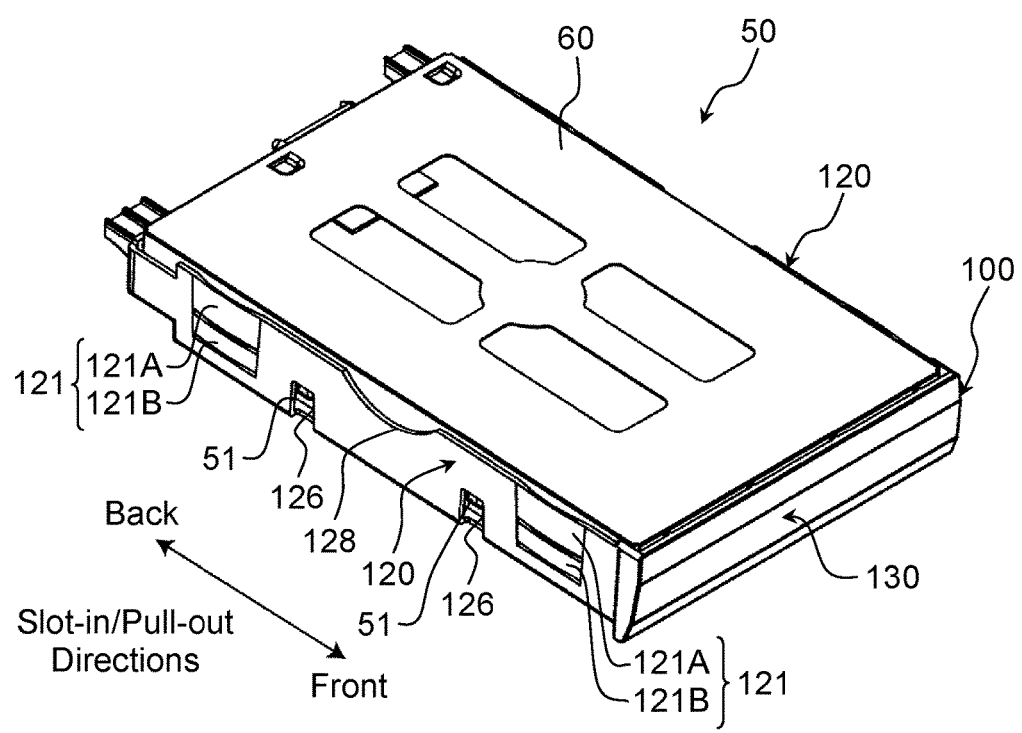
FIG. 2 is a perspective view of a recording medium unit (an HDD unit) in accordance with the first exemplary embodiment.

FIG. 2 is a perspective view of HDD unit 50 as a recording medium unit of the first exemplary embodiment. HDD unit 50 has hard disk drive 60 (hereinafter, HDD 60) as a recording medium device and hard disk case 100 (hereinafter, HDD case 100) as a recording medium case for accommodating HDD 60. In the exemplary embodiment, HDD 60 is formed as a structure in which a hard disk drive having a disk medium covered with elastic material and a protecting case. HDD 60 has a substantially rectangular shape. The hard disk drive may be directly accommodated in HDD case 100.

The components shown in FIG. 2, which have not been mentioned yet, will be described later.

Figure 3A:
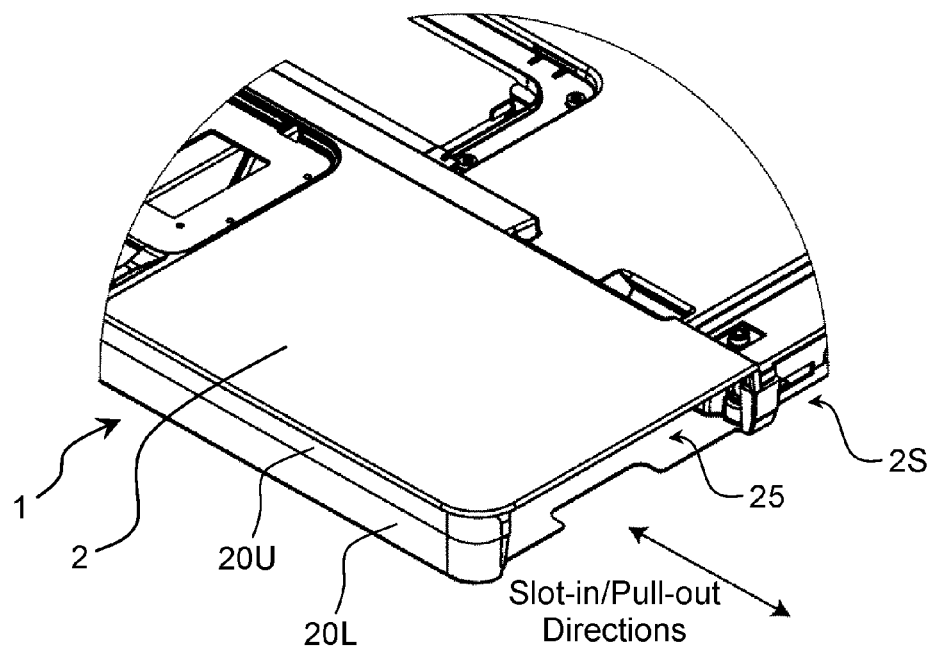
FIG. 3A is an enlarged perspective view of a part close to the accommodating section of the electronic device for accommodating the HDD unit, showing a state where the HDD unit is removed from the electronic device.
Figure 3B:
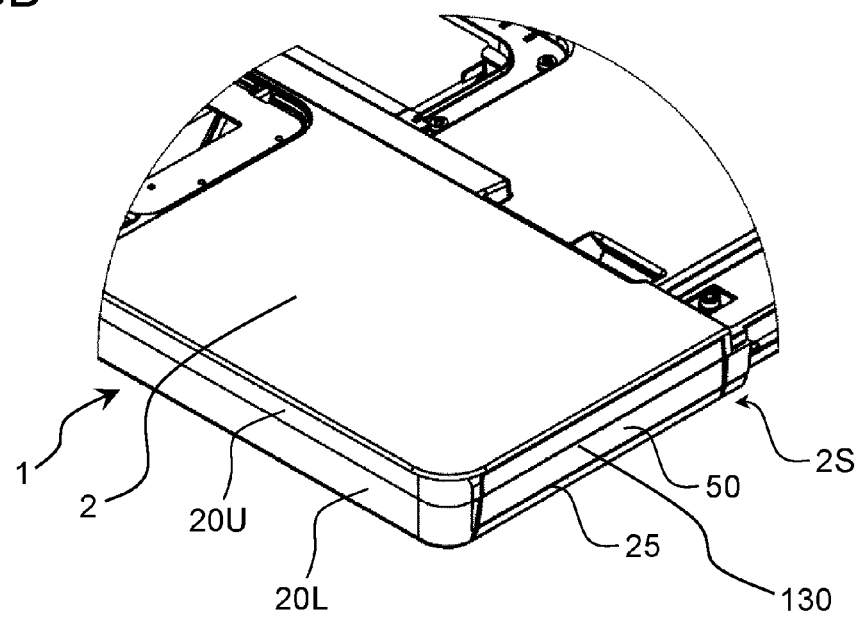
FIG. 3B is an enlarged perspective view of a part close to the accommodating section of the electronic device for accommodating the HDD unit, showing a state where the HDD unit is accommodated in the electronic device.

FIG. 3A is an enlarged perspective view of a part close to accommodating section 25 for accommodating HDD unit 50 of electronic device 1, showing a state where HDD unit 50 is removed from electronic device 1. FIG. 3B is an enlarged perspective view of a part close to accommodating section 25 for accommodating HDD unit 50 of electronic device 1, showing a state where HDD unit 50 is accommodated in electronic device 1. As shown in FIG. 3A, accommodating section 25 is a slot that opens into the outside of side 2S located parallel to the width direction of main unit 2 of electronic device 1. HDD unit 50 is removably disposed in accommodating section 25 in the slot-in/pull-out directions as shown by the arrow. In the embodiment, the slot-in/pull-out directions are parallel to the width direction (see FIG. 1) of electronic device 1. In a state where HDD unit 50 has been accommodated in accommodating section 25, as shown in FIG. 3B, the surface of front section 130 (see FIG. 2) of HDD unit 50 is substantially flush with the surface of side 2S of main unit 2. In the description of HDD unit 50 and HDD case 100 (see FIG. 2), for the sake of easy understanding, a front side and a back side may be defined with reference to the slot-in/pull-out directions. For example, in the description, the side close to the user in the slot-in/pull-out directions may be referred to "front" and the side far from the user in the directions may be referred to "back".

In most cases, the outer shell of main unit 2 is formed of upper housing 20U and lower housing 20L.

Figure 4:
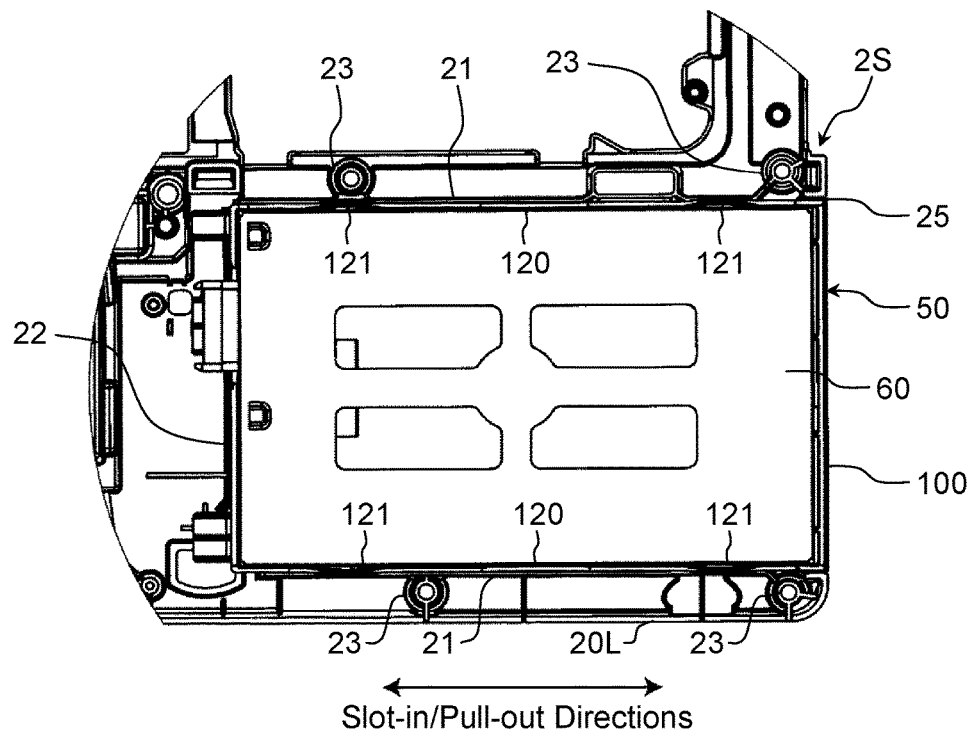
FIG. 4 is a plan view of the interior of the electronic device, showing a state where the HDD unit is accommodated in the accommodating section of the electronic device of the first exemplary embodiment.
Figure 5:
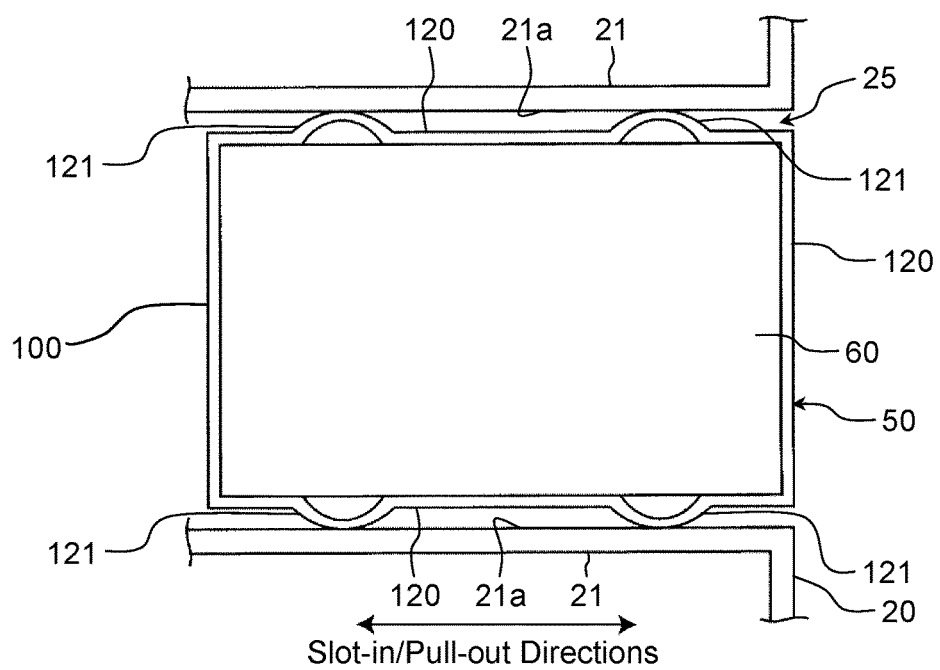
FIG. 5 is a schematic view showing a state where the HDD unit is accommodated in the accommodating section of the electronic device of the first exemplary embodiment.

FIG. 4 is a plan view of the interior of electronic device 1, showing a state where HDD unit 50 is accommodated in accommodating section 25 of electronic device 1 of the first exemplary embodiment. FIG. 5 is a schematic view showing a state where HDD unit 50 is accommodated in accommodating section 25 of electronic device 1 of the first exemplary embodiment.

The main surfaces of upper housing 20U and lower housing 20L of main unit 2, which are the inner surfaces located perpendicular to the thickness direction (see FIG. 1) of main unit 2, has first side-walls 21 and second side-wall 22 on the side that faces the interior of main unit 2. First side-walls 21 form side surfaces 21a of accommodating section 25 (see FIG. 5). HDD unit 50 is inserted, from the outside of electronic device 1, into the space surrounded by the side walls of accommodating section 25. The sections adjacent to first side-walls 21 have bosses 23 at which upper housing 20U and lower housing 20L are secured by screws. Bosses 23 enhance stand-up rigidity of first side-walls 21. In particular, according to the embodiment, bosses 23 are discretely disposed on the left-end side and the right-end side in the longitudinal direction of first side-walls 21, i.e., in the width direction (see FIG. 1) of main unit 2. The structure increases the stand-up rigidity of almost over the entire area of first side-walls 21 in the longitudinal direction of first side-walls 21. By virtue of increase in stand-up rigidity of the side walls, accommodating section 25 for accommodating HDD unit 50 has greatly improved support rigidity, contributing to enhanced vibration-resistant performance of HDD unit 50.

As shown in FIG. 5, according to the structure of the embodiment, HDD case 100 has a plurality of protruding sections 121 on its side sections 120. HDD unit 50 is so structured that protruding sections 121 of HDD case 100 make contact with side surfaces 21a of accommodating section 25 of main unit 2 when HDD unit 50 is accommodated in accommodating section 25. Hereinafter, the structure will be described in detail.

Figure 6:
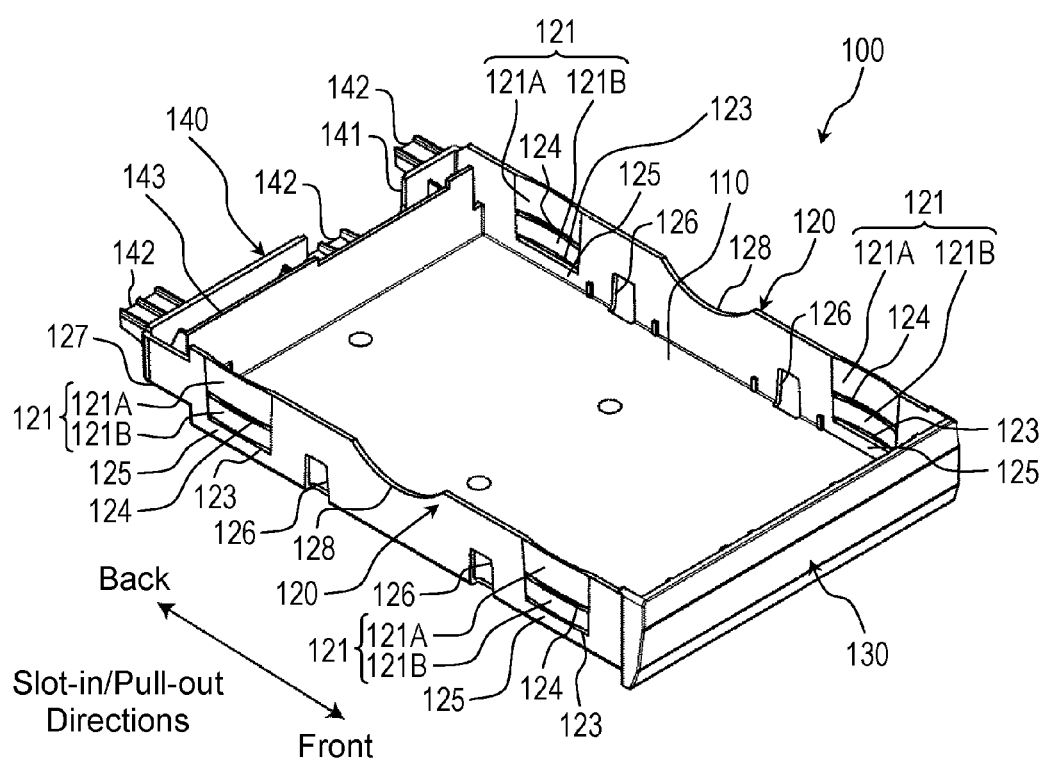
FIG. 6 is a perspective view of a recording medium case (an HDD case) of the first exemplary embodiment.
Figure 7A:
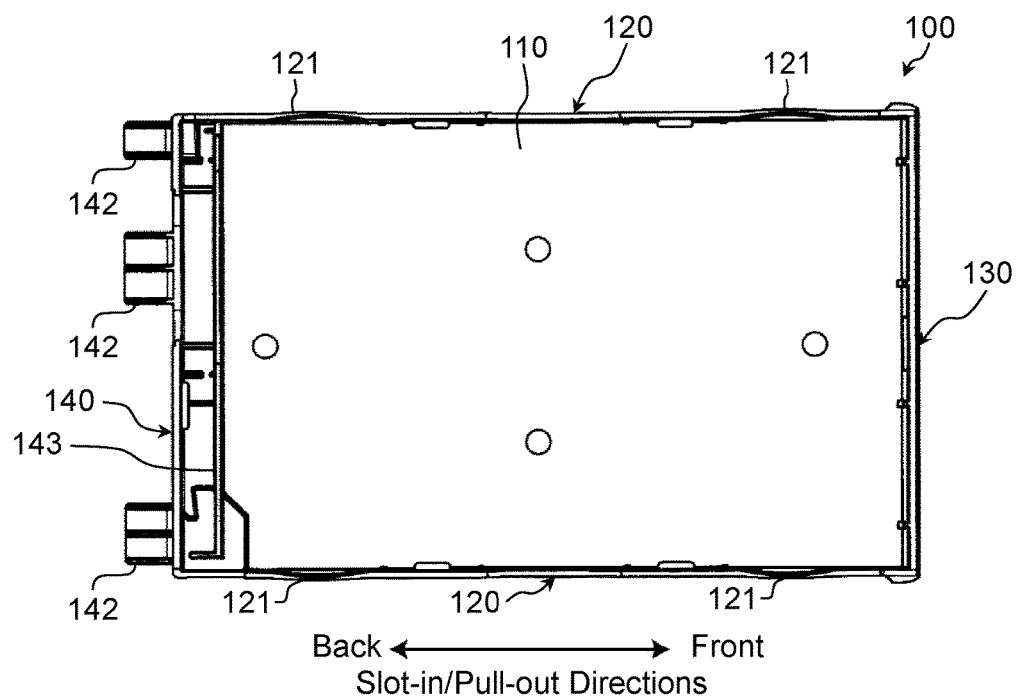
FIG. 7A is a plan view of the HDD case of the first exemplary embodiment.
Figure 7B:
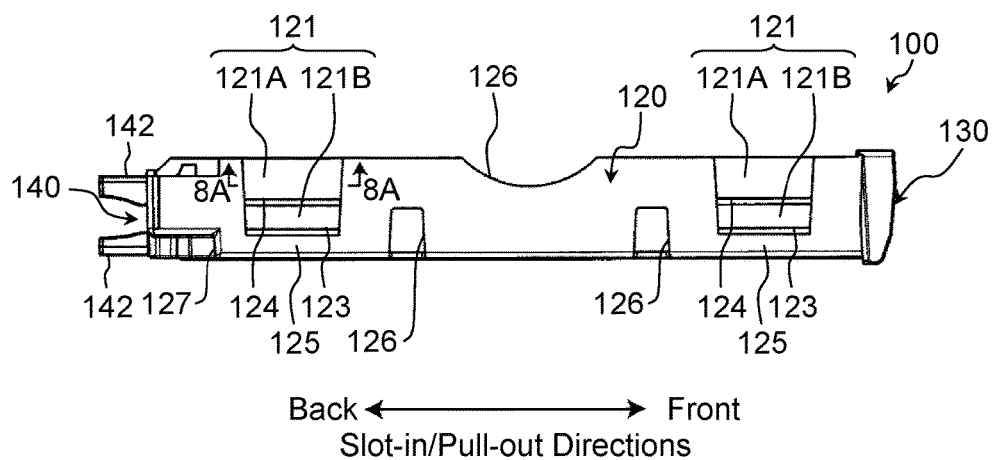
FIG. 7B is a side view of the HDD case of the first exemplary embodiment.

FIG. 6 is a perspective view of the HDD case of the first exemplary embodiment. FIG. 7A is a plan view of the HDD case of the first exemplary embodiment, and FIG. 7B is a side view of the HDD case of the first exemplary embodiment.

As shown in the figures, HDD case 100 has flat section 110, two side sections 120, front section 130, and rear section 140. As HDD case 100 is made of resin, flat section 110, two side sections 120, front section 130, and rear section 140 have elasticity. When external force is applied to HDD case 100, it can change its shape. When HDD 60 is accommodated in HDD case 100 (see FIG. 2), flat section 110 faces one of the main surfaces of HDD 60. Each of side sections 120, front section 130, and rear section 140 is disposed on each end of flat section 110 so as to be perpendicular to flat section 110. The longitudinal direction of side sections 120 is parallel to the slot-in/pull-out directions in which HDD case 100 is slotted into accommodating section 25 and is pulled out from section 25.

In the state where HDD unit 50 is accommodated in accommodating section 25 of main unit 2, front section 130 of HDD case 100 forms a part of side 2S of main unit 2 (see FIG. 3B).

Rear section 140 has notch 141 and a plurality of engagement projections 142 that projects backward. Notch 141 accepts a connector for connecting between HDD 60 and other circuits of main unit 2. In the state where HDD unit 50 is accommodated in accommodating section 25 of main unit 2, engagement projections 142 have engagement with engagement parts (not shown) of second side-wall section 22 (see FIG. 4) of housing 20 that forms main unit 2.

Second rear section 143, which is formed on the front side of rear section 140, supports the rear end of HDD unit 50.

Two side sections 120 are formed into a substantially rectangular shape. Each of side sections 120 has engagement pit 127, engagement hole 126, and arc notch 128.

Engagement pit 127 of HDD case 100 is formed close to rear section 140. When HDD unit 50 is accommodated in accommodating section 25 of main unit 2, engagement pit 127 engages with an engagement member (not shown) of main unit 2, by which HDD unit 50 is locked onto main unit 2.

Engagement hole 126 is formed in side section 120 of HDD case 100. When HDD unit 50 is accommodated in accommodating section 25 of main unit 2, engagement hole 126 engages with engagement projection 51 (see FIG. 2) disposed on the side surface of HDD 60.

When removing HDD 60 from HDD case 100, the user can hold HDD 60 by fingers through arc notch 128 of HDD case 100.

Further, the side section 120 of the structure of the embodiment has protruding sections 121. Hereinafter, protruding sections 121 will be described in detail.

1-3. Structure of Protruding Section

As shown in FIG. 6, FIG. 7A, and FIG. 7B, each protruding section 121 is formed on side section 120 such that a part of side section 120 is protruded from HDD case 100 toward outside. Two protruding sections 121 are formed at two positions separate from each other in the longitudinal direction of side section 120. When HDD unit 50 is accommodated in accommodating section 25 of electronic device 1 (see FIG. 3A), protruding sections 121 make contact with side surfaces 21a of first side-walls 21 of accommodating section 25 (hereinafter, side surfaces 21a of accommodating section 25, as necessary), as shown in FIG. 5.

According to the structure above, when HDD unit 50 is accommodated in accommodating section 25 of electronic device 1, protruding sections 121 make contact with side surfaces 21a of accommodating section 25. The structure suppresses rattling of HDD unit 50 accommodated in electronic device 1. Besides, if electronic device 1 undergoes a shaky movement, protruding section 121 absorbs the vibration and suppresses the transmission of it to HDD unit 50. This provides HDD unit 50 with enhanced vibration-resistant performance. For example, when the user uses electronic device 1 in a swaying car, a shaky movement is applied to electronic device 1. The structure above, however, suppresses transmission of the vibration to HDD unit 50, offering a great effect.

According to the structure above, each protruding section 121 is formed such that a part of side section 120 is outwardly protruded from HDD case 100. When HDD unit 50 is accommodated in accommodating section 25, each side surface 21a of accommodating section 25 makes contact with only protruding sections 121 as part of side section 120 of HDD case 100. That is, each side section 120 of HDD case 100 makes contact with corresponding side surface 21a of accommodating section 25 with small contact areas. When HDD unit 50 is slotted in accommodating section 25 or removed from there, the sliding movement of HDD case 100 produces friction between side sections 120 of HDD case 100 and side surfaces 21a of accommodating section 25. However, compared to the case where each side section 120 of HDD case 100 makes contact with corresponding side surface 21a with the entire area, the structure of the embodiment has a small friction between them. It means that the user can easily slot HDD unit 50 into accommodating section 25 or remove it from there. That is, the structure enhances operability of slot-in/pull-out operations between HDD unit 50 and accommodating section 25 of electronic device 1.

In the case where HDD unit 50 is removably mounted on electronic device 1, the structure of the embodiment provides the HDD unit with good operability of slot-in/pull-out operations and good vibration-resistant performance.

Further, each protruding section 121 of the embodiment has the structure below. Hereinafter, it will be described one by one.

Figure 8A:
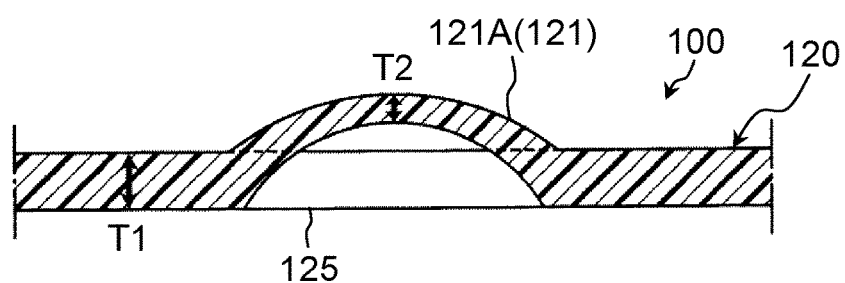
FIG. 8A is a cross-section view (taken along the line 8A-8A of FIG. 7B) of the protruding section of the HDD case of the first exemplary embodiment.
Figure 8B:
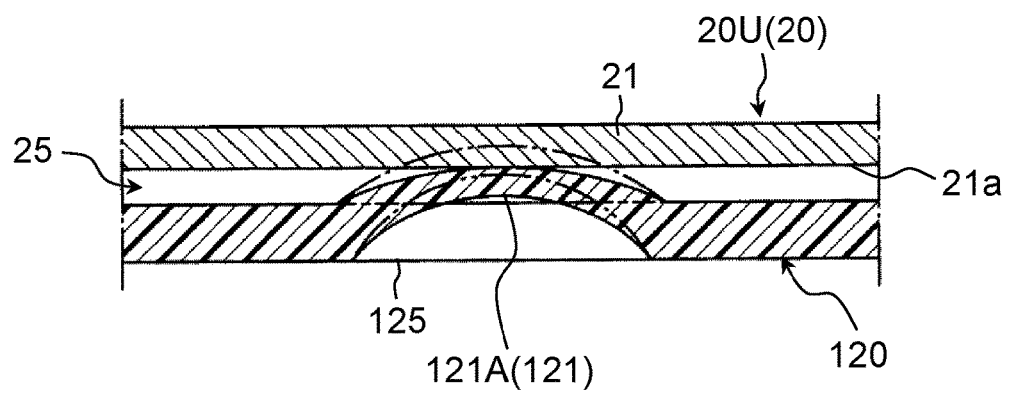
FIG. 8B is a cross-section view showing the protruding section of the HDD case when the HDD case is accommodated in the accommodating section of the electronic device of the first exemplary embodiment.

FIGS. 8A and 8B are cross-section views, taken along the line 8A-8A of FIG. 7B, showing protruding section 121 of HDD case 100 of the first exemplary embodiment. Specifically, FIG. 8A shows the state of protruding section 121 when HDD unit 50 is not in electronic device 1, whereas FIG. 8B shows protruding section 121 accommodated in electronic device 1. In the figures, for the sake of easy understanding, the protruding amount of protruding section 121 is enlarged than it really is.

As shown in FIG. 8A, protruding section 121 is formed such that the protruding amount at the both end sections in the longitudinal direction of side section 120 gradually increases toward the center of protruding section 121. By virtue of the structure, each time HDD unit 50 is slotted in accommodating section 25 or is pulled out from there, first, the end section having a small protruding amount of protruding section 121 makes contact with side surface 21a of accommodating section 25; and then, protruding section 121 makes contact with side surface 21a of accommodating section 25 with gradual increase in protruding amount. The structure allows protruding section 121 to smoothly slide on side surface 21a of accommodating section 25, enhancing operability when HDD unit 50 is slotted in accommodating section 25 or is pulled out from there.

According to the structure of the embodiment, protruding section 121 has an arch-shaped cross section perpendicular to a direction perpendicular to the longitudinal direction of side section 120. The structure allows protruding section 121 and side surface 21a of accommodating section 25 to have a line contact perpendicular to a direction in which HDD unit 50 moves. Since they have a line contact, not a surface contact, the friction produced by the sliding movement of protruding section 121 and side surface 21a further decreases. The structure allows HDD unit 50 to have a smooth movement when it is slotted in accommodating section 25 or is pulled out from there, offering further enhanced operability.

Thickness T2—the thickness of the thinnest part of protruding section 121—is thinner than thickness T1 of side section 120 other than protruding section 121. The structure allows protruding section 121 to have an elastic change greater than other parts (not including protruding section 121). For example, as shown in FIG. 8B, in the proximity of the contact position of protruding section 121 and side surface 21a of accommodating section 25 (i.e., side surface 21a of first side-wall 21 of housing 20), protruding section 121 is pressed against side surface 21a of accommodating section 25 of housing 20, so that protruding section 121 has an elastic change so as to have decrease in protruding amount from the center of protruding section 121 toward the end sections of it in the longitudinal direction of side section 120. Protruding section 121 flexibly changes its shape each time HDD unit 50 is slotted in accommodating section 25 or pulled out from there. The structure therefore sensitively responds to a slight vibration, and further enhances the vibration resistance of HDD unit 50; at the same time, it decreases friction produced by sliding movement between protruding section 121 and side surface 21a of accommodating section 25, providing further enhanced operability of slot-in/pull-out operations. The thinnest part of protruding section 121 (thickness T2) has 30-50% of the thickness of other parts (thickness T1) of side section 120 (not including protruding section 121). The thickness ratio of T1 to T2 should be determined according to the gap size between side section 120 and side surface 21a of the accommodating section and the sliding condition between them.

Figure 9A:
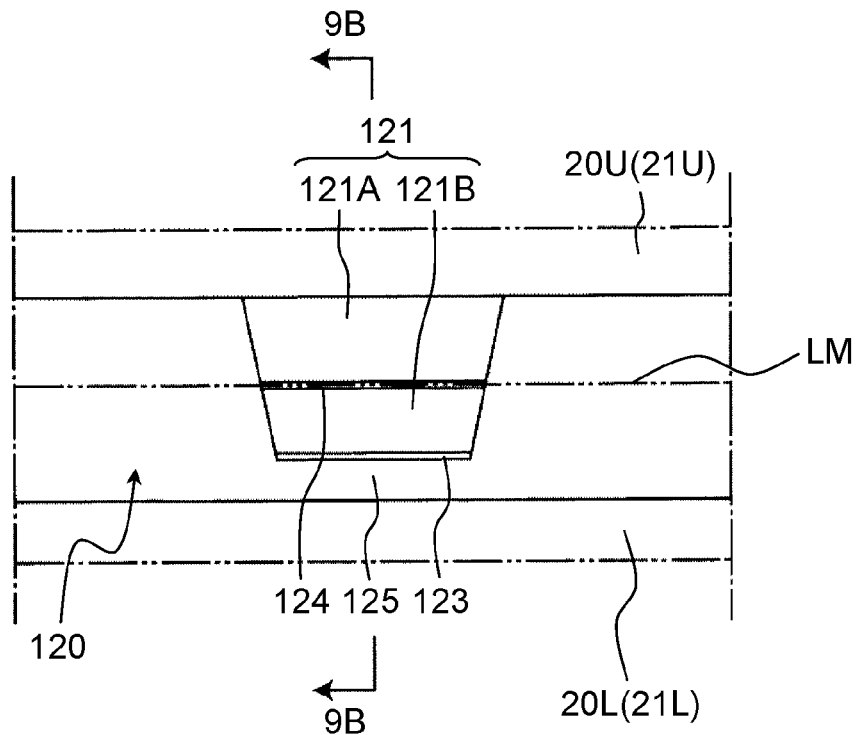
FIG. 9A is an enlarged view of the protruding section of the HDD case of the first exemplary embodiment.
Figure 9B:
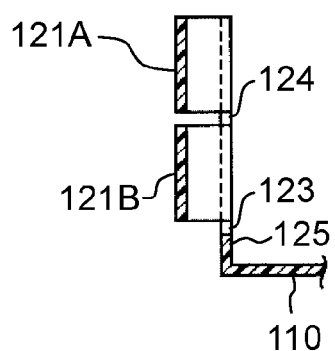
FIG. 9B is a cross-section view (taken along the line 9B-9B of FIG. 9A) of the protruding section of the HDD case of the first exemplary embodiment.
Figure 9C:
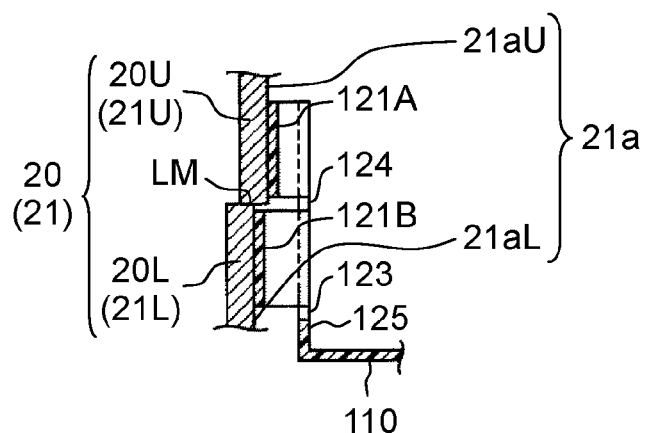
FIG. 9C is a cross-section view showing the protruding section of the HDD case when the HDD case is accommodated in the accommodating section of the electronic device of the first exemplary embodiment.

FIGS. 9A through 9C show protruding section 121 of HDD case 100 of the first exemplary embodiment. Specifically, FIG. 9A is an enlarged view of protruding section 121; FIG. 9B is a cross-section view taken along the line 9B-9B of FIG. 9A; and FIG. 9C is a cross-section view showing a state where HDD unit 50 is accommodated in electronic device 1.

Protruding section 121 is formed into a trapezoidal shape—seen from the front of side section 120—having a pair of sides parallel to the longitudinal direction of side section 120. Further, of the boundaries between protruding section 121 and the parts other than protruding section 121 of HDD case 100, the boundary that parallel to the longitudinal direction of side section 120 has slit 123. The structure having the slit allows protruding section 121 to change its shape with no influence on the other parts of side section 120, further enhancing operability of slot-in/pull-out operations.

Protruding section 121 is formed on side section 120 between the position of the upper end that is parallel to the longitudinal direction of side section 120 and a position with an interval from the lower end toward the upper end. In other words, a part between the lower end and a position with an interval from the lower end has no protruding section 121. That is, the part of side section 120, which has no protruding section 121 on the side of flat section 110, works as wall section 125, ensuring rigidity of side section 120. If a protruding section is disposed in a part having no protruding section 121, the protruding section is hard to change its shape due to rigidity of flat section 110. That is the reason why wall section 125 is left on the part having no protruding section 121 so as to ensure rigidity of side section 120, instead of forming the protruding section.

Besides, protruding section 121 is divided into small protrusion 121A and small protrusion 121B by slit 124 in the direction perpendicular to the longitudinal direction of side section 120 (i.e., in the direction parallel to the thickness direction of electronic device 1 when HDD unit 50 is accommodated in electronic device 1). Housing 20 of main unit 2 may be divided into two housings—upper housing 20U and lower housing 20L—in the thickness direction of main unit 2 (electronic device 1). According to the structure of the embodiment, as shown in FIG. 9C, upper small protrusion 121A makes contact with upper housing 20U (specifically, side surface 21aU of upper wall 21U that forms the upper part of first side-wall section 21). Similarly, lower small protrusion 121B makes contact with lower housing 20L (specifically, side surface 21aL of lower wall 21L that forms the lower part of first side-wall section 21). In the embodiment, the vertical position of slit 124 between small protrusion 121A and small protrusion 121B and the vertical length of small protrusion 121A are determined so as to meet with the position of matching surface LM of upper housing 20U and lower housing 20L. With the structure above, as shown in FIG. 9C, small protrusion 121A makes contact with upper housing 20U; similarly, small protrusion 121B makes contact with lower housing 20L.

The description below is on the case where housing 20 is formed of upper housing 20U and lower housing 20L. In such structured housing 20, when upper housing 20U and lower housing 20L have manufacturing tolerances and variations in assembly precision, a bump can be formed, as shown in FIG. 9C, between side surface 21aU of upper housing 20U and side surface 21aL of lower housing 20L. In that case, if protruding section 121 has a non-divided structure, it cannot make contact with both upper housing 20U and lower housing 20L. This causes a gap between protruding section 121 and the housing, by which improvement in vibration-resistant performance can be suppressed. According to the structure of the embodiment, however, small protrusion 121A and small protrusion 121B can reliably make contact with upper housing 20U and lower housing 20L, respectively, as shown in FIG. 9C. That is, even when housing 20 is formed of upper housing 20U and lower housing 20L, improvement in vibration-resistant performance is obtained.

Figure 10:
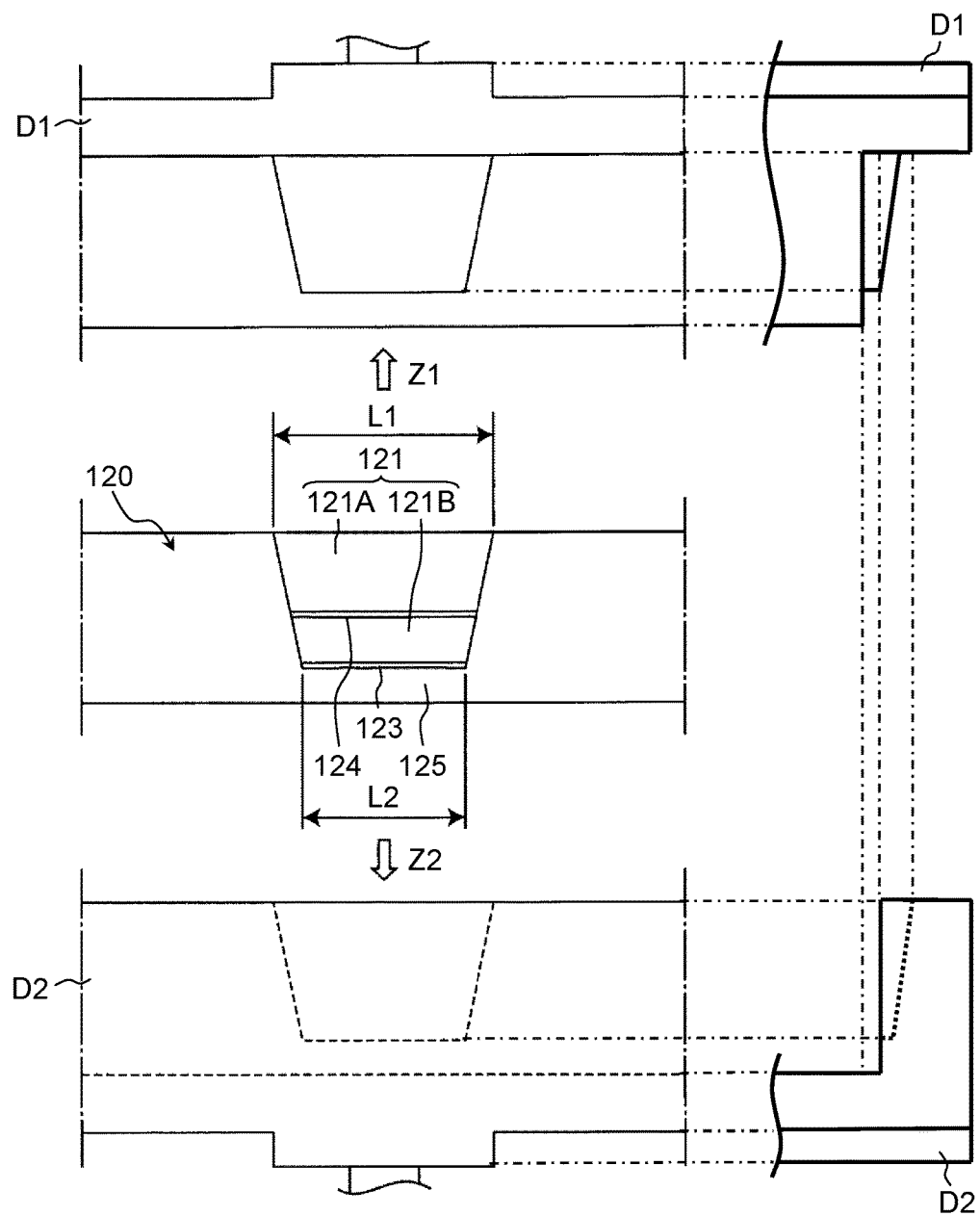
FIG. 10 illustrates a method for producing the HDD case of the first exemplary embodiment.

FIG. 10 illustrates a method for producing HDD case 100 of the first exemplary embodiment.

Protruding section 121 has a trapezoidal shape—seen from the front of side section 120—having a pair of sides (i.e., an upper side and a lower side) parallel with the longitudinal direction of side section 120. The upper side of protruding section 121 is closer to the upper end of side section 120 than the lower side of protruding section 121. Length L1 of the upper side (a first side) is longer than length L2 of the lower side (a second side). The structure above is determined on the reason below. According to the structure of the embodiment, HDD case 100 is made of resin, as described earlier, and is formed by molding. Specifically, HDD case 100 is formed by using first die D1 for forming the inner face of HDD case 100 and second die D2 for the outer face of it. With use of the two dies, HDD case 100 is molded of resin by injection molding. In the injection molding process, first die D1 moves in the direction opposite to Z1 direction, whereas second die D2 moves in the direction opposite to the Z2 direction, by which the injected resin is clamped. The Z1 direction and the Z2 direction are perpendicular to flat section 110 of HDD case 100. After resin is injected and then cooled down, first die D1 is moved in the Z1 direction and second die D2 is moved in the Z2 direction for mold opening. For example, slit 123 and slit 124 can be formed by using a slide mold movable in a direction perpendicular to the moving direction of second die D2, but the slide mold is omitted in FIG. 10. In the mold-opening process of first die D1 and second die D2, the mold has to be easily opened and manufacturing quality has to be kept at a constant level. To meet the requirement, the embodiment employs the following structure. That is, protruding section 121 of the embodiment has a shape—seen from the front of side section 120—of a trapezoid having a pair of sides (of an upper side with a length of L1, and a lower side with a length of L2) parallel with the longitudinal direction of side section 120; and at that time, length L1 is longer than length L2. The aforementioned structure not only allows first die D1 and second die D2 to be opened easily, but also allows the product to be easily removed from the dies in mold opening. That is, HDD case 50 can be easily produced with use of a molding die. The structure of the embodiment allows resin-made HDD case 50 to be produced with use of a die, enhancing vibration-resistant performance and operability of slot-in/pull-out operations.

According to the structure of the embodiment, as described above, two protruding sections 121 are disposed at two positions separate from each other (see FIGS. 6 through 8) in the longitudinal direction of side section 120. The structure provides HDD unit 50 accommodated in accommodating section 25 with a stable support. If each of side sections 120 has only one protruding section 121 disposed at only one position, each side surface of HDD unit 50 (i.e., each side section 120) makes contact with electronic device 1 at only one position—between single protruding section 121 and side surface 21a of accommodating section 25. At that time, in accommodating section 25, each end section of HDD unit 50 in the longitudinal direction of side section 120 can slightly rotate on the contact position of protruding section 121 and side surface 21a in the plane perpendicular to the thickness direction of main unit 2. In the structure of the embodiment, however, two protruding sections 121 are formed at two positions separate from each other in the longitudinal direction of each side surface of HDD unit 50 (i.e., of each side section 120). That is, when accommodated in accommodating section 25, HDD unit 50 is supported by side surface 21a of accommodating section 25 at two positions separately disposed in the longitudinal direction of each side sections 120. The structure suppresses the aforementioned slight rotation of HDD unit 50 on the side of its both ends in the longitudinal direction of side section 120, by which the vibration resistant performance further enhances.

Besides, according to the embodiment, protruding section 121 protrudes in a direction perpendicular to side section 120, i.e., it protrudes in a direction parallel to the disk surface of the recording disk of HDD 60 in HDD case 100. With the structure above, vibration created in the direction parallel to the disk surface of the recording disk is absorbed. When HDD 60 undergoes vibration in the direction parallel to the disk surface of a recording disk, the reading/writing speed is often impaired. In the structure of the embodiment, however, protruding section 121 protrudes from side section 120 to the outer side of HDD case 100. That is, protruding section 121 protrudes in the direction perpendicular to side section 120, i.e., in the direction parallel to the disk surface. The structure absorbs vibration occurred in the direction parallel to the disk surface, suppressing degradation in performance, such as reading/writing speed of HDD 60 in mobile electronic device 1. As a result, the structure offers significant improvement in vibration-resistant performance (of HDD 60) of electronic device 1.

The structure has been described on the premise that the longitudinal direction of side section 120 of HDD case 100 is parallel to the direction in which HDD unit 50 is slotted in electronic device 1 or pulled out of it. However, in the structure of the embodiment, a direction perpendicular to the longitudinal direction of side section 120 of HDD case 100 may be parallel to the slot-in/pull-out directions of HDD unit 50. That is, according to the embodiment, either one of the directions—the longitudinal direction of side section 120 of HDD case 100 or a direction perpendicular to the longitudinal direction—is parallel to the slot-in/pull-out directions of HDD unit 50.

2. Effect

HDD case 100 of the embodiment, which is a recording medium case, accommodates HDD 60 as a recording medium device having a disk medium and forms HDD unit 50 as a recording medium unit. HDD unit 50 can be slotted into accommodating section 25 of electronic device 1 and can be pulled out from there.

HDD 60 is formed into a substantially rectangle. HDD case 100 has a pair of side sections 120 that are parallel to the direction in which HDD unit is slotted in accommodating section 25 and pulled out from there. Besides, each side section 120 of HDD case 100 has protruding sections 121 each formed such that a part of side section 120 is protruded toward the outside of HDD case 100. When HDD case 100 is accommodated in accommodating section 25 of electronic device 1, protruding sections 121 make contact with side surfaces 21a of accommodating section 25.

According to the embodiment, when HDD unit 50 is accommodated in accommodating section 25 of electronic device 1, protruding sections 121 make contact with side surfaces 21a of accommodating section 25. Under the state where HDD unit 50 is accommodated in electronic device 1, the structure suppresses rattling of HDD unit 50; at the same time, when the electronic device undergoes a shaky movement, the structure absorbs the vibration and suppresses transmission of the vibration to HDD unit 50. This enhances the vibration-resistance performance of the HDD unit. When HDD unit 50 is slotted in accommodating section 25 or pulled out from there, sliding friction occurs between side surface 21*a* of accommodating section 25 and HDD case 100 of HDD unit 50. However, the structure of the embodiment has sliding friction smaller than the structure where each side surface 21*a* of accommodating section 25 makes contact with corresponding side section 120 of HDD case 100 with the entire area. This allows HDD unit 50 to be easily slotted in, or easily pulled out of, accommodating section 25 of electronic device 1. As described above, when HDD unit 50 is removably disposed in an electronic device, HDD case 100 of the embodiment enhances operability of slot-in/pull-out operations and vibration-resistant performance.

According to the structure of the embodiment, the longitudinal direction of side section 120 (as a first direction which is either the longitudinal direction or the direction perpendicular to the longitudinal direction) is parallel to the slot-in/pull-out directions of HDD unit 50. Besides, in the longitudinal direction (as the first direction which is either the longitudinal direction or the direction perpendicular to the longitudinal direction) of side section 120, the protruding amount of protruding section 121 gradually increases from each end section toward the center of it.

When HDD unit 50 is slotted in accommodating section 25 or pulled out of there, such structured protruding section 121 gradually makes contact with side surface 21*a* of accommodating section 25, smoothly sliding over side surface 21*a*. That is, the structure enhances operability of slot-in/pull-out operations.

According to the structure of the embodiment, protruding section 121 has an arch-shaped cross section perpendicular to a direction perpendicular to the longitudinal direction (as the first direction which is either the longitudinal direction or the direction perpendicular to the longitudinal direction) of side section 120.

The structure above allows the contact between protruding section 121 and side surface 21*a* of accommodating section 25 to be a line contact that is perpendicular to the direction in which protruding section 121 moves. That is, the structure decreases the friction caused by the sliding movement of protruding section 121 and side surface 21 of accommodating section 25, further enhancing operability of slot-in/pull-out operations of HDD unit 50.

Further, according to the structure of the embodiment, thickness T2 of protruding section 121 is thinner than thickness T1 of side section 120 other than protruding section 121 (see FIG. 8A).

The structure allows protruding section 121 to have an elastic change greater than the parts other than including protruding section 121, responding sensitively to a slight shaky movement and providing HDD unit 50 with further enhanced vibration-resistant performance. At the same time, the structure decreases the friction between protruding section 121 and side surface 21*a* of accommodating section 25, further enhancing operability of the slot-in/pull-out operations.

According to the embodiment, side section 120 is formed into a substantially rectangular shape—seen from the front of side section 120—having a pair of sides parallel to the longitudinal direction (as a first direction) of side section 120. Besides, protruding section 121 is formed into a substantially rectangular shape or a trapezoidal shape—seen from the front of side section 120—having a pair of sides parallel to the longitudinal direction (as the first direction) of side section 120.

Further, of the boundaries between protruding section 121 and the parts other than protruding section 121 of HDD case 100, the boundary that is parallel to the longitudinal direction (as the first direction) of side section 120 has slit 123.

The structure having the slit allows protruding section 121 to change its shape with no influence on the other parts of side section 120, further enhancing operability of slot-in/pull-out operations.

In the structure of the embodiment, side section 120 has the longitudinal direction as the first direction. Of a pair of end sections of side section 120, which is parallel to the longitudinal direction of side section 120, one end section is referred to the upper end (the first end), and the other end section is referred to the lower end (the second end). HDD case 100 has flat section 110. Flat section 110 is perpendicular to a pair of side sections 120 and connects between the second ends of side sections 120. Each protruding section 121 is formed on side section 120 between the upper end and a position with an interval from the lower end toward the upper end. That is, a part of side section 120 close to flat section 110 has no protruding section 121 and works as wall section 125, which ensures rigidity of side section 120.

In the structure of the embodiment, side section 120 has the longitudinal direction as the first direction. HDD case 100 is made of resin. Each protruding section 121 is formed into a trapezoidal shape having the upper side (the first side) and the lower side (the second side) which are parallel to the longitudinal direction of the side section 120. Length L1 of the upper side is longer than length L2 of the lower side.

The structure above allows resin-made HDD case 100 to be easily produced by a mold, enhancing the vibration-resistant performance and operability of slot-in/pull-out operations.

In the embodiment, protruding section 121 is divided into small protrusion 121A and small protrusion 121B (i.e., a plurality of small protrusions) in the direction perpendicular to the longitudinal direction of side section 120.

Even when housing 20 of main unit 2 is divided, for example, into upper housing 20U and lower housing 20L in the direction perpendicular to the longitudinal direction of side section 120, small protrusion 121A and small protrusion 121B make contact with upper housing 20U and lower housing 20L, respectively. Therefore, the structure of the embodiment offers improvement in vibration-resistant performance even when housing 20 is formed of upper housing 20U and lower housing 20L.

According to the structure of the embodiment, each side section 120 has two protruding sections 121 at two positions separate from each other in the longitudinal direction of side section 120.

The structure allows each side section 120 to make contact with side surface 21*a* of accommodating section 25 at two positions disposed separate from each other in the longitudinal direction of side section 120. That is, HDD unit 50 accommodated in accommodating section 25 is supported by side surface 21*a* of accommodating section 25 at the two positions disposed separate from each other in the longitudinal direction of side section 120. The structure prevents HDD unit 50 from rattling; specifically, prevents both ends of HDD unit 50 in the longitudinal direction of side section 120 from having a shaky movement in a plane perpendicular to the thickness direction of main unit 2.

Therefore, the structure further enhances the vibration-resistant performance of HDD unit 50.

Besides, according to the embodiment, protruding section 121 protrudes in a direction parallel to the disk surface of the recording disk of HDD 60 accommodated in HDD case 100.

With the structure above, vibration created in the direction parallel to the disk surface of the recording disk is effectively absorbed. As a result, the structure offers significant improvement in vibration-resistant performance (of HDD 60) of electronic device 1.

HDD unit 50 of the embodiment has HDD case 100 with the structure above and HDD 60 to be accommodated in HDD case 100.

The structure above offers HDD unit 50 with excellent vibration-resistant performance and operability of slot-in/pull-out operations.

Electronic device 1 of the embodiment has HDD unit 50 and accommodating section 25 for accommodating HDD unit 50. Accommodating section 25 has a pair of side surfaces 21a that faces each side section 120 of HDD case 100 in a state where the HDD unit 50 is accommodated in accommodating section 25. When HDD unit 50 is accommodated in accommodating section 25, protruding sections 121 of side sections 120 make contact with side surfaces 21a.

The structure offers electronic device 1 having HDD unit 50 with excellent vibration-resistant performance and operability of slot-in/pull-out operations.

Other Exemplary Embodiments

The structure of the first exemplary embodiment has been described in detail as an example of the technology of the present disclosure. However, the technique of the present disclosure is not limited to the structure described above, allowing modification, replacement, addition, and omission without departing from the spirit and scope of the claimed disclosure.

Hereinafter, other exemplary embodiments will be described.

In the description below, components corresponding to those in the structure of the first exemplary embodiment have similar reference marks for the sake of convenience.

Figure 11:
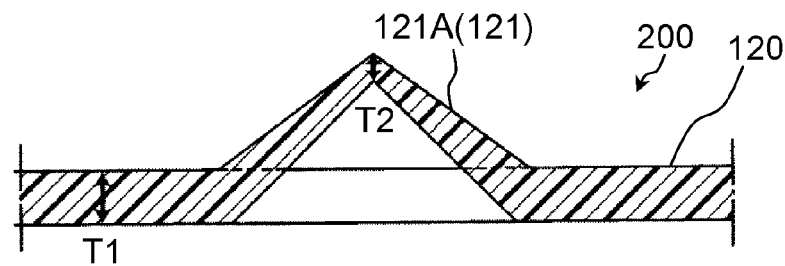
FIG. 11 is a cross-section view of the protruding section of the HDD case of other exemplary embodiments.

According to the structure of the first exemplary embodiment, protruding section 121 has an arch-shaped cross section perpendicular to a direction perpendicular to the longitudinal direction of side section 120. In the present disclosure, however, the cross section may be a triangle as shown in FIG. 11 showing the part of HDD case 200. In that case, too, protruding section 121 of side section 120 and side surface 21a of accommodating section 25 (see FIG. 8B) have a point-contact or a line-contact in a direction perpendicular to the moving direction of HDD case 200. Therefore, compared to the case where each side section 120 makes contact with corresponding side surface 21a of accommodating section 25 with the entire area, the structure has a small friction between them. That is, the structure enhances the vibration-resistant performance and operability of slot-in/pull-out operations.

Figure 12:
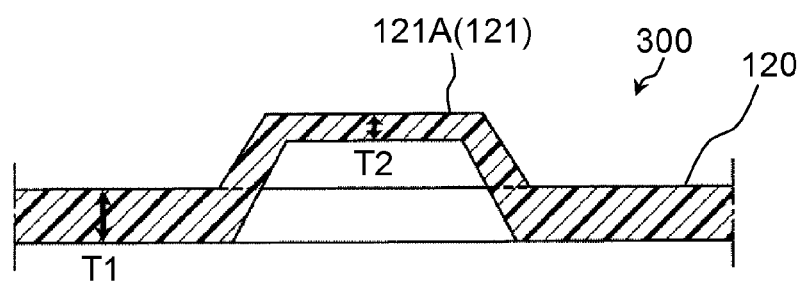
FIG. 12 is a cross-section view of the protruding section of the HDD case of other exemplary embodiments.

Further, as shown in the part of HDD case 300 of FIG. 12, protruding section 121 of the present disclosure may have a trapezoidal cross-section perpendicular to a direction perpendicular to the longitudinal direction of side section 120. In that case, too, compared to the case where each side section 120 makes contact with corresponding side surface 21a of accommodating section 25 with the entire area, they make contact with a small area and therefore friction between them decreases. Like the case in the first exemplary embodiment, the structure also enhances the vibration-resistant performance and operability of slot-in/pull-out operations. When the structure has a plurality of protruding sections 121, the cross section of protruding section 121 perpendicular to a direction perpendicular to the longitudinal direction of side section 120 may be an arch, a trapezoid, a triangle, or a combination of other shapes.

According to the structure of the first exemplary embodiment, thickness T2 of protruding section 121 is smaller than thickness T1 of the parts other than protruding section 121 of side section 120 (see FIG. 8A). However, the thickness of protruding section 121 may be the same as that of the parts other than protruding section 121 of side section 120. In that case, too, protruding section 121 of side section 120 and side surface 21a of accommodating section 25 have a point-contact or a line-contact perpendicular to a direction in which the HDD case moves. Therefore, compared to the case where each side section 120 makes contact with corresponding side surface 21a of accommodating section 25 with the entire area, the structure has a small friction between them. That is, like the case in the first exemplary embodiment, the structure enhances not only the vibration-resistant performance but also operability of slot-in/pull-out operations.

Figure 13:
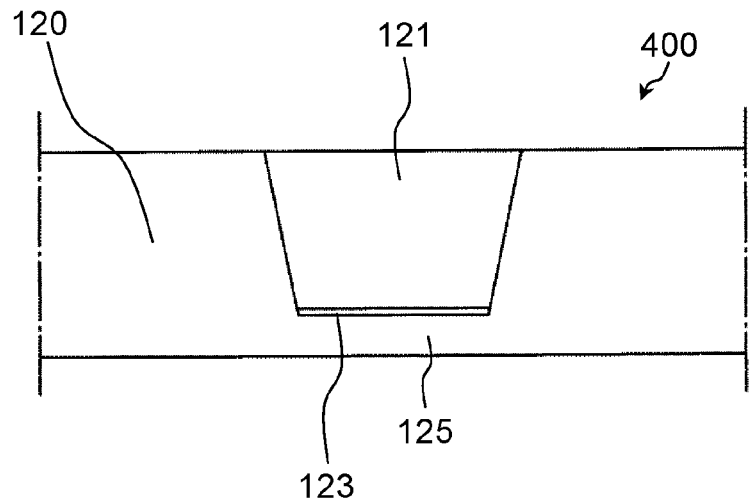
FIG. 13 is a side view of the HDD case of other exemplary embodiments.
Figure 14:
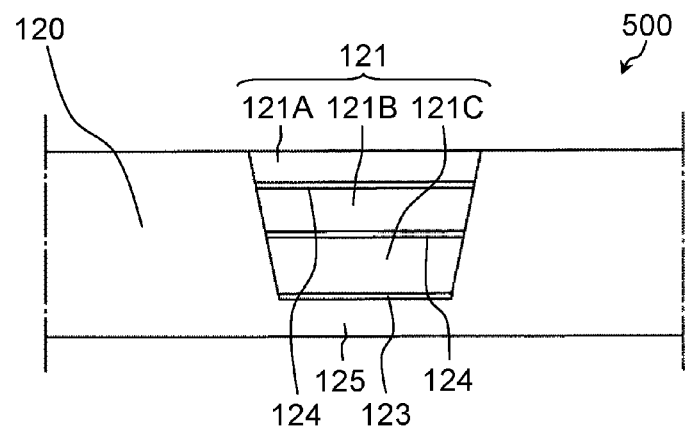
FIG. 14 is a side view of the HDD case of other exemplary embodiments.

According to the structure of the first exemplary embodiment, protruding section 121 is divided into two pieces (i.e., small protrusions 121A and 121B). However, in the present disclosure, protruding section 121 may be a non-divided structure, as is shown in FIG. 13 that shows the part of HDD case 400. For example, when housing 20 is formed of a single member, or when the HDD device is accommodated in only one of the members that form housing 20, protruding section 121—even when it is a non-divided structure—maintains an appropriate contact with side surface 21a of accommodating section 25. Further, protruding section 121 may be divided into three pieces (i.e., small protrusions 121A, 121B, and 121C), as is shown in FIG. 14 that shows the part of HDD case 500. For example, when housing 20 is formed of three members and HDD case 100 is accommodated in housing 20 while making contact with all three members, the divided three pieces (of small protrusions 121A, 121B, 121C) change each shape independently and make contact with respective three members of housing 20. When housing 20 is formed of more than three members, protruding section 121 may be divided into pieces so as to correspond to the number of the members.

According to the structure of the first exemplary embodiment, protruding section 121 has a trapezoidal shape having a pair of sides (i.e., an upper side and a lower side) parallel to the longitudinal direction of side section 120; and at that time, length L1 of the upper side (the first side) is longer than length L2 of the lower side (the second side). However, protruding section 121 may have a substantially rectangular shape where length L1 of the upper side (the first side) is equal to length L2 of the lower side (the second side). For example, when HDD case 100 is formed by a 3D printer, instead of molding, the shape of protruding section 121 seen from the front of side section 120 may be a substantially rectangle.

According to the structure of the first exemplary embodiment, protruding section 121 is formed into a substantially trapezoidal shape—seen from the front of side section 120—having a pair of sides parallel to the longitudinal direction of side section 120. Further, of the boundaries between protruding section 121 and the parts other than protruding section 121 of HDD case 100, the boundary that is parallel to the longitudinal direction of side section 120 has slit 123. However, protruding section 121 may be formed as in HDD case 600 shown in FIG. 15A. That is, protruding section 121 may be formed into a round shape seen from the front of side section 120 and slit 123 (see FIG. 14) may not be formed between protruding section 121 and the parts other than protruding section 121 of HDD case 600. In that case, as shown in FIG. 15B, protruding section 121 has an arch-shaped cross section and it is formed such that the protruding amount of protruding section 121 gradually increases from the both end sections of protruding section 121 toward the center of it in a direction parallel to the longitudinal direction of side section 120 (i.e., in the slot-in/pull-out directions). Compared to the case where each side section 120 makes contact with corresponding side surface 21a of accommodating section 25 with the entire area, the structure has a small friction between them. That is, as is the same with the case in the first embodiment, the structure enhances not only the vibration-resistant performance but also operability of slot-in/pull-out operations. The shape of protruding section 121—seen from the front of side section 120—is not limited to be round; it may be an oval, a polygon. Protruding section 121 can be formed into any shape as long as it has an elastic change in a direction perpendicular to side section 120.

Figure 15A:
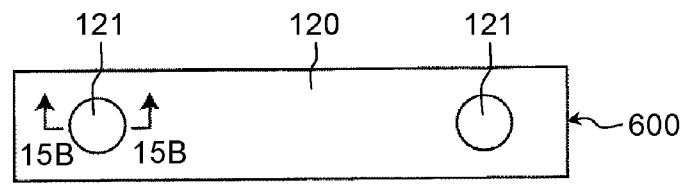
FIG. 15A is a side view of the HDD case of other exemplary embodiments.
Figure 15B:
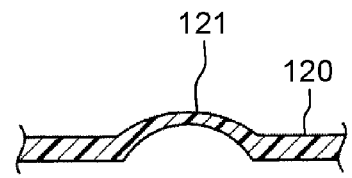
FIG. 15B is a cross-section view taken along the line 15B-15B of FIG. 15A.
Figure 16:
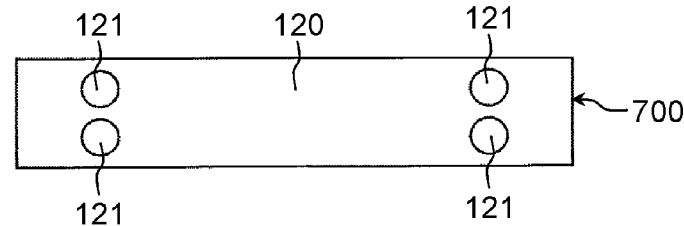
FIG. 16 is a side view of the HDD case of other exemplary embodiments.

Further, as is HDD case 700 shown in FIG. 16, a plurality of protruding sections 121 formed into a round shape (as is shown in FIGS. 15A and 15B) may be formed on side section 120 in a direction perpendicular to the longitudinal direction of side section 120. Even when housing 20 of main unit 2 is divided into a plurality of housing members in a direction perpendicular to the longitudinal direction of side section 120, each protruding section 121 makes contact with each of the divided housing members, like the structure of the first exemplary embodiment. That is, even when housing 20 is formed of a plurality of housing members, the structure above enhances the vibration-resistant performance.

According to the structure of the first exemplary embodiment, accommodating section 25 is disposed on side 2S of the main unit of the electronic device, and the longitudinal direction of side section 120 of the HDD case is parallel to the slot-in/pull-out directions (see FIG. 3A and FIG. 3B). However, in the present disclosure, accommodating section 25 is disposed on bottom 2B of main unit 2 shown in FIG. 17A. In that case, accommodating section 25 may be disposed such that the longitudinal direction of side section 120 of HDD case 800 is perpendicular to the slot-in/pull-out directions of HDD case 800. FIG. 17B shows a cross-section view taken along the line 17B-17B of FIG. 17A. As shown in FIG. 17B, protruding section 121 has an arch-shaped cross section and it is formed such that the protruding amount of protruding section 121 gradually increases from the both end sections in a direction perpendicular to the longitudinal direction of side section 120 (in the slot-in/pull-out directions) toward the center of protruding section 121. In that case, too, protruding section 121 of side section 120 and side surface 21a of accommodating section 25 have a point-contact or a line-contact in a direction perpendicular to the moving direction of HDD case 800. Therefore, compared to the case where each side section 120 makes contact with corresponding side surface 21a of accommodating section 25 with the entire area, the structure has a small friction between them. That is, the structure enhances not only the vibration-resistant performance but also operability of slot-in/pull-out operations, like the structure described in the first exemplary embodiment. In the structure above, the cross section of protruding section 121 may be a triangle, a trapezoid, or a combination of them.

Figure 17A:
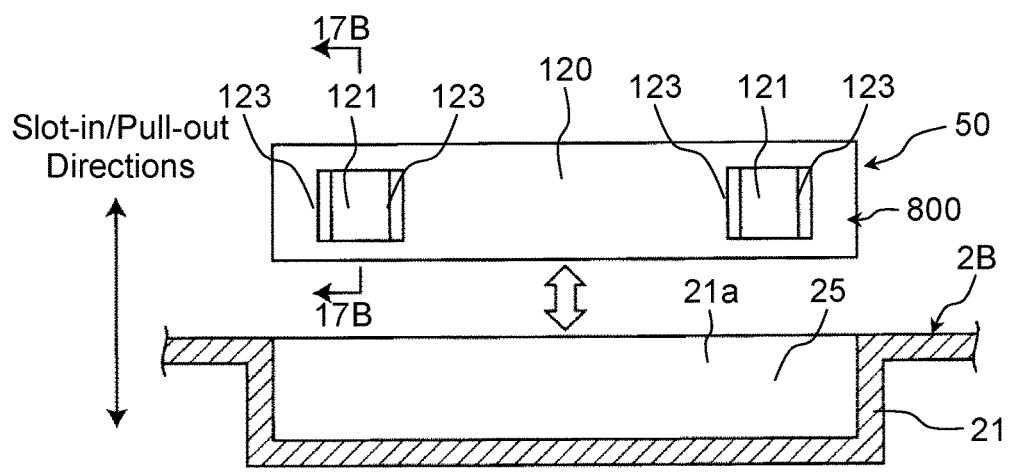
FIG. 17A is a schematic view illustrating a state where the HDD case of other exemplary embodiments is accommodated in the electronic device.
Figure 17B:
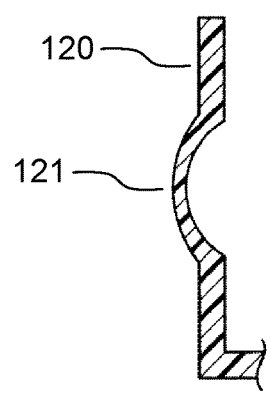
FIG. 17B is a cross-section view taken along the line 17B-17B of FIG. 17A.

Further, protruding section 121 of FIG. 17A has a shape—seen from the front of side section 120—formed into a substantially rectangle having a pair of sides parallel to a direction perpendicular to the longitudinal direction of side section 120. Besides, of the boundaries between protruding section 121 and the parts other than protruding section 121 of HDD case 800, the boundary that is parallel to a direction perpendicular to the longitudinal direction of side section 120 has slits 123. The structure having the slits allows protruding section 121 to change its shape independently from the parts other than protruding section 121 of side section 120, further enhancing operability of slot-in/pull-out operations.

In the structure shown in FIG. 17A, two protruding sections 121 are disposed at two positions separate from each other in the longitudinal direction of side section 120. That is, HDD unit 50 accommodated in accommodating section 25 is supported at two positions separate from each other in the longitudinal direction of side surface 21a of accommodating section 25. The structure suppresses rattling of the end sections of HDD unit 50 in the longitudinal direction, further enhancing the vibration-resistant performance.

In the structure of the first exemplary embodiment, as described above, two protruding sections 121 are disposed on each side section 120 at two positions disposed separate in the longitudinal direction, but each side section 120 may have more than three protruding sections 121 at more-than-three positions disposed separate from each other in the longitudinal direction of side section 120. In that case, each protruding section 121 changes its shape independently from each other to have an appropriate contact with side surface 21a of accommodating section 25.

Although HDD 60 described in the first exemplary embodiment is a hard disk drive covered with elastic material and a protecting case, it may be a hard disk drive directly accommodated in HDD case 100.

The electronic device described in the first exemplary embodiment is a notebook PC, but it is not limited to; the electronic device may be, for example, a tablet PC, a smartphone, a portable music player, a game machine, a digital camera, or a digital video camcorder. That is, the electronic device can be any device as long as the device uses a recording medium unit having a recording medium device with a recording disk.

The structures of the embodiments have been described in detail with reference to accompanying drawings.

In addition to a component essential for solving problems, the accompanying drawings and the in-detail description can contain a component used for illustrative purpose in the technology but not essential for solving problems. It will be understood that not all the components described in the drawings and description are essential for solving problems.

Further, it will be understood that the aforementioned embodiment is merely an example of the technique of the present disclosure. That is, the technique of the present disclosure is not limited to the structure described above, allowing modification, replacement, addition, and omission without departing from the spirit and scope of the claimed disclosure.

INDUSTRIAL APPLICABILITY

The present disclosure is widely useful for a recording medium case that accommodates a recording medium unit (a recording medium device) having a recording disk and is removably disposed in an accommodating section of an electronic device. The present disclosure is also widely useful for a recording medium unit having the recording medium case with the structure above and a recording medium device to be accommodated in the recording medium case. The present disclosure also widely useful for an electronic device having the recording medium unit with the structure above, and an accommodating section capable of accommodating the recording medium unit.

REFERENCE MARKS IN THE DRAWINGS

1: electronic device
2: main unit
2B: bottom
2S: side
3: display unit
4: hinge
20: housing
20U: upper housing
20L: lower housing
21: first side-wall
21a, 21aU, 21aL: side surface
22: second side-wall
23: boss
24: dent section
25: accommodating section
31: touch pad
32: operation button
33: liquid crystal display (LCD) panel
50: HDD unit (recording medium unit)
51: engagement projection
60: HDD (recording medium device)
100, 200, 300, 400, 500, 600, 700, 800: HDD case (recording medium case)
110: flat section
120: side section
121: protruding section
121A, 121B, 121C: small protrusion
123: slit
124: slit
125: wall section
126: engagement hole
128: arc notch
127: engagement pit
130: front section
140: rear section
141: notch
142: engagement projection
143: second rear section
D1: first die
D2: second die
L1: length of the upper side of the protruding section
L2: length of the lower side of the protruding section
LM: matching surface
T1: thickness of the protruding section
T2: thickness of the side section other than the protruding section
Z1: moving direction of first die (when it is opened)
Z2: moving direction of second die (when it is opened)

The invention claimed is:

1. A recording medium case that accommodates a recording medium device having a recording disk and is removably disposed in an accommodating section of an electronic device, wherein the recording medium device has a substantially rectangular shape,
the recording medium case comprising:
a pair of side sections located parallel to slot-in/pull-out directions in which the recording medium case is slotted into the accommodating section and is pulled out from the accommodating section;
at least one protruding section formed on each side section such that at least one part of each side section is protruded to an outside of the recording medium case so as to make contact with one of side surfaces of the accommodating section when the recording medium case is accommodated in the accommodating section, and
the at least one protruding section is divided into a plurality of protrusions in a direction perpendicular to the longitudinal direction of the side sections.

2. The recording medium case according to claim 1, wherein
the slot-in/pull-out directions are parallel to a first direction which is either a longitudinal direction of the side sections or a direction perpendicular to the longitudinal direction, and
the at least one protruding section is so formed that a protruding amount of an end section in the first direction gradually increases toward a center of the protruding section.

3. The recording medium case according to claim 2, wherein the at least one protruding section has an arch-shaped cross section perpendicular to a direction perpendicular to the first direction.

4. The recording medium case according to claim 2, wherein the at least one protruding section has a triangular cross-section perpendicular to a direction perpendicular to the first direction.

5. The recording medium case according to claim 2, wherein the at least one protruding section has a trapezoidal cross-section perpendicular to a direction perpendicular to the first direction.

6. The recording medium case according to claim 1, wherein the at least one protruding section has a thickness smaller than parts other than the at least one protruding section of the side sections.

7. The recording medium case according to claim 2, wherein
the side sections are formed into a substantially rectangular shape, seen from a front of the side sections, having a pair of sides parallel to the first direction,
the at least one protruding section is formed into a substantially rectangular shape or a substantially trapezoidal shape, seen from a front of the side section, having a pair of sides parallel to the first direction, and
of boundaries between the at least one protruding section and parts other than the at least one protruding section, a slit is formed at a boundary that is parallel to the first direction.

8. The recording medium case according to claim 7, wherein
the first direction is the longitudinal direction of the side sections, and each of the side sections has a first end and a second end as a pair of end sections parallel to the longitudinal direction of the side sections,
the recording medium case further comprising:
a flat section that is perpendicular to the pair of the side sections and connects between respective second ends of the side sections, wherein the at least one protruding section is formed on each side section so as to be located between the first end and a position with an interval from the second end toward the first end.

9. The recording medium case according to claim 8, wherein
the first direction is the longitudinal direction of the side sections,
the recording medium case is made of resin,
the at least one protruding section is formed into a trapezoidal shape having a first side and a second side as the pair of sides parallel to the longitudinal direction of the side sections,
the first side of the at least one protruding section is closer to the first end of the side section than the second side of the at least one protruding section, and
the first side has a length longer than the second side.

10. The recording medium case according to claim 1, wherein the at least one protruding section comprises a plurality of protruding sections formed on each side section at a plurality of positions separate from each other in the longitudinal direction of the side sections.

11. The recording medium case according to claim 1, wherein the at least one protruding section protrudes from each side section in a direction parallel to a disk surface of the recording disk of the recording medium device accommodated in the recording medium case.

12. A recording medium unit comprising:
the recording medium case described in claim 1; and
the recording medium device accommodated in the recording medium case.

13. An electronic device comprising:
the recording medium unit described in claim 12; and
an accommodating section capable of accommodating the recording medium unit, further comprising:
a pair of side surfaces that faces each side section of the recording medium case and makes contact with the at least one protruding section on each side section in a state where the recording medium unit is accommodated in the accommodating section.

* * * * *